US007517420B2

(12) United States Patent
Lin

(10) Patent No.: US 7,517,420 B2
(45) Date of Patent: Apr. 14, 2009

(54) METHOD FOR FABRICATING ELECTROSTATIC-LINE BRUSH

(76) Inventor: Chuan-Yaun Lin, No. 12, Lane 180, Jianguo Rd., Toufen Township, Miaoli County 351 (TW)

( * ) Notice: Subject to any disclaimer, the term of this patent is extended or adjusted under 35 U.S.C. 154(b) by 458 days.

(21) Appl. No.: 11/402,027

(22) Filed: Apr. 12, 2006

(65) Prior Publication Data

US 2007/0240267 A1 Oct. 18, 2007

(51) Int. Cl.
*B32B 38/04* (2006.01)
*B32B 37/02* (2006.01)

(52) U.S. Cl. ....................... 156/166; 156/252; 156/253; 156/256; 156/263; 361/212; 361/214; 361/216; 361/217; 361/220; 361/221

(58) Field of Classification Search ................. 156/250, 156/166, 263, 268, 269, 289, 300, 301, 324; 361/212, 214, 216, 217, 220, 221
See application file for complete search history.

(56) References Cited

U.S. PATENT DOCUMENTS

| | | | | | |
|---|---|---|---|---|---|
| 3,904,929 | A | * | 9/1975 | Kanaya et al. | 361/220 |
| 4,352,143 | A | * | 9/1982 | Uno | 361/221 |
| 4,553,191 | A | * | 11/1985 | Franks et al. | 361/212 |
| 6,048,119 | A | * | 4/2000 | Kato et al. | 400/624 |

* cited by examiner

*Primary Examiner*—Mark A Osele
*Assistant Examiner*—Christopher C Caillouet
(74) *Attorney, Agent, or Firm*—Troxell Law Office, PLLC

(57) ABSTRACT

The present invention provides a method for producing an electrostatic brush for an electrical device or a hand-held tool; and, the electrostatic brush can be eaily fabricated and contains electrostatic lines to be used with ease.

5 Claims, 10 Drawing Sheets

METHOD FOR FABRICATING ELECTROSTATIC-LINE BRUSH

FIELD OF THE INVENTION

The present invention relates to fabricating an electrostatic brush; more particularly, relates to deposing electrostatic lines on a required electrical device or a hand-held tool, where the electrostatic brush is easily fabricated and is used with ease.

DESCRIPTION OF THE RELATED ART

A prior art, "An electrostatic brush", is proclaimed in Taiwan, comprising a first conductive plastic layer, an aluminum plate layer and a second conductive plastic layer, where the first conductive plastic layer is a conductive plastic plate with a sawtooth-shape part at bottom for gathering static electricity rapidly to be discharged; the aluminum plate layer is an aluminum plate sticked on an upper surface of the first conductive plastic layer; and the second conductive plastic layer is a conductive plastic plate sticked on an upper surface of the aluminum plate layer for strengthen its rigidity. With the electrostatic brush of the prior art set at the openings of office appliances, such as a printer, a fax, a photostat, etc., static electricity can be discharged into the shell of the office appliances.

Although the electrostatic brush can be set at the openings of office appliances to discharge static electricity into the shell of the office appliances by contacting the paper for discharging static electricity through the sawtooth-shape part at the bottom of the first conductive plastic layer, the paper may be worn out by the sawtooth-shape part owing to its rigidity. In addition, the rigid first conductive plastic layer can not be used for a motherboard or a delicate componant to discharge static electricity. Hence, the prior art does not fulfill users' requests on actual use.

SUMMARY OF THE INVENTION

The main purpose of the present invention is to depose electrostatic lines horizontally thourgh punched holes of a cover layer of an electrostatic brush, where the electrostatic brush is used in an electrical device or a hand-held tool with easy fabrication and easy usage of the electrostatic brush.

To achieve the above purpose, the present invention is a method for fabricating an electrostatic-line brush, comprising steps of (a) obtaining a cover layer; (b) adhering the cover layer with electrostatic lines; (c) cutting the cover layer to be sticked to a base layer; (d) cutting the cover layer to obtain a semifinished brush; and (e) cutting the semifinished brush into halfs and pasting the halfs on a release paper to obtain a finished brush having the electrostatic lines. Accordingly, a novel method for fabricating an electrostatic-line brush is obtained.

BRIEF DESCRIPTIONS OF THE DRAWINGS

The present invention will be better understood from the following detailed description of the preferred embodiment according to the present invention, taken in con junction with the accompanying drawings, in which FIG. 1 is a perspective view showing a preferred embodiment according to the present invention;

DESCRIPTION OF THE PREFERRED EMBODIMENT

The following description of the preferred embodiment is provided to understand the features and the structures of the present invention.

Figure 1:
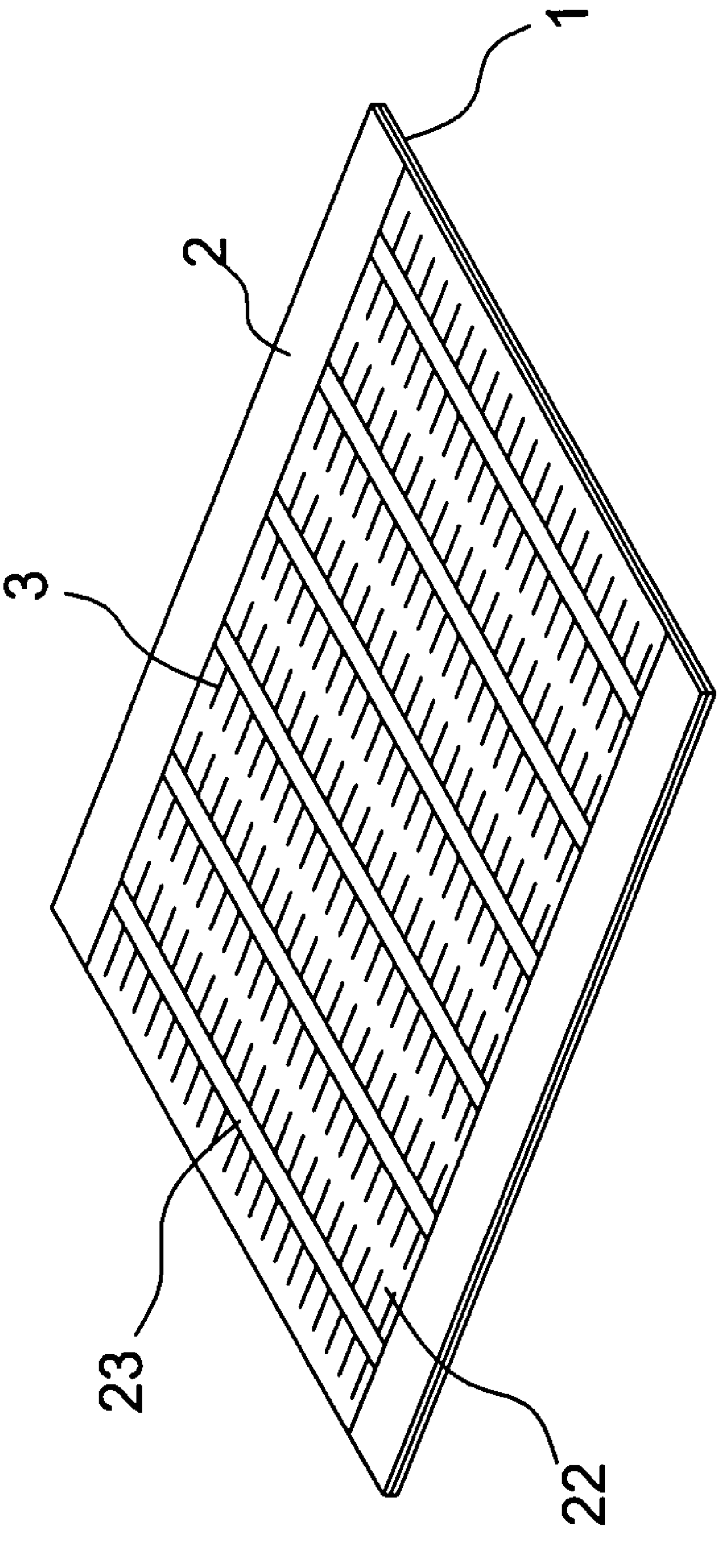
Figure 2:
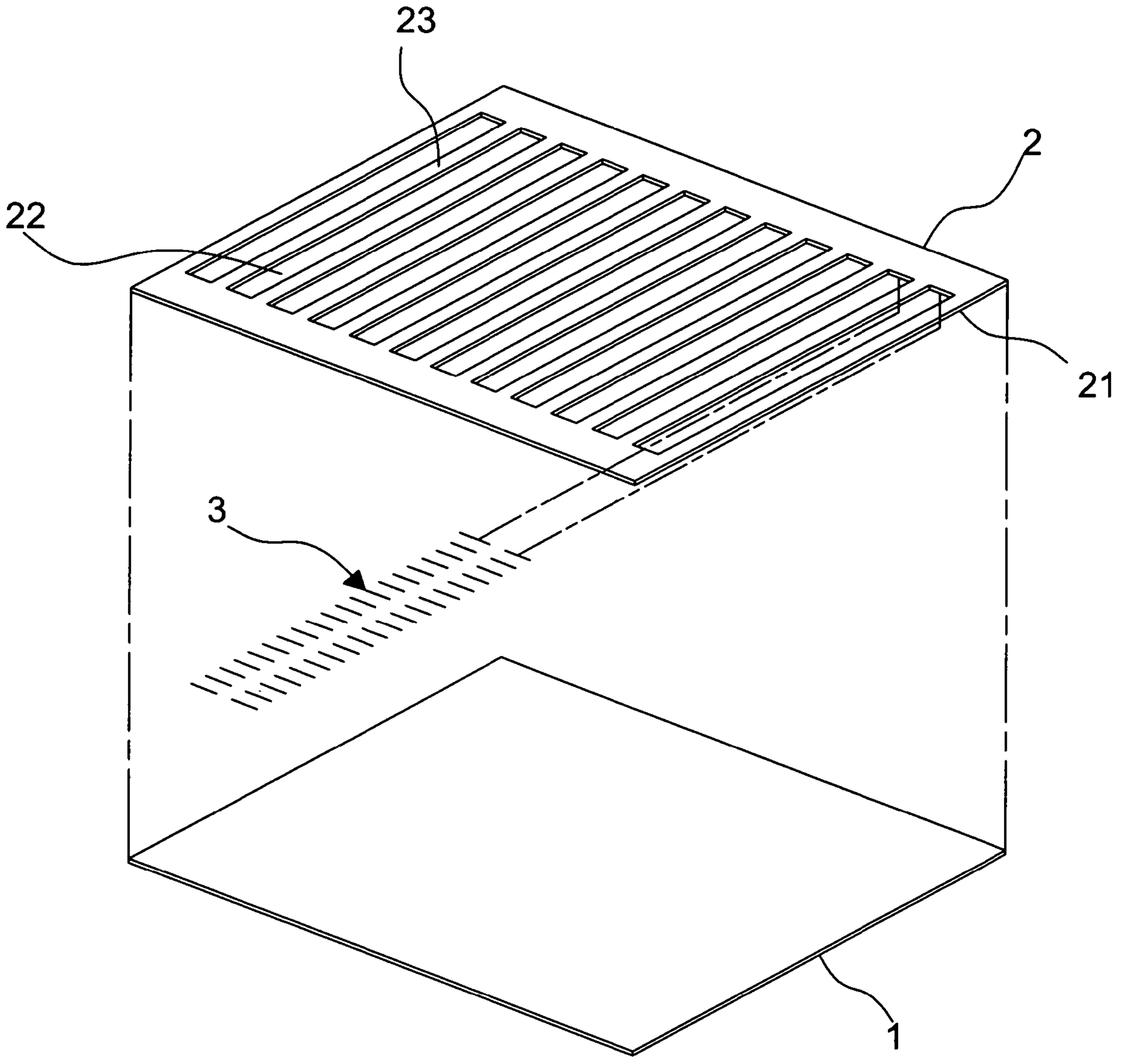
FIG. 2 is a structural view showing the preferred embodiment according to the present invention.

Please refer to FIG. 1 and FIG. 2, which are a perspective and a structural views showing a preferred embodiment according to the present invention. As shown in the figures, the present invention is a method for fabricating an electrostatic-line brush where the electrostatic-line brush comprises a base layer 1, a cover layer 2 and a plurality of electrostatic lines 3; and the electrostatic lines are used with an electrical hand-held tool with a method for easily fabricating an electrostatic brush having electrostatic lines with easy usage. The base layer 1 is a conductive mold (polystyrene) or an aluminum foil tape. The cover layer 2 is cove red on a surface of the base layer 1; the cover layer 2 is a tape with an adhering surface 21 and the surface is corresponding to the base layer 1; the cover layer 2 has more than one punched hole 22; and a connecting part 23 is deposed between every two adjacent punched holes 22. A plurality of electrostatic line 3 is deposed between the base layer 1 and the cover layer 2, horizontally deposed through the punched holes 22. Thus an electrostatic-line brush is obtained.

Figure 3:
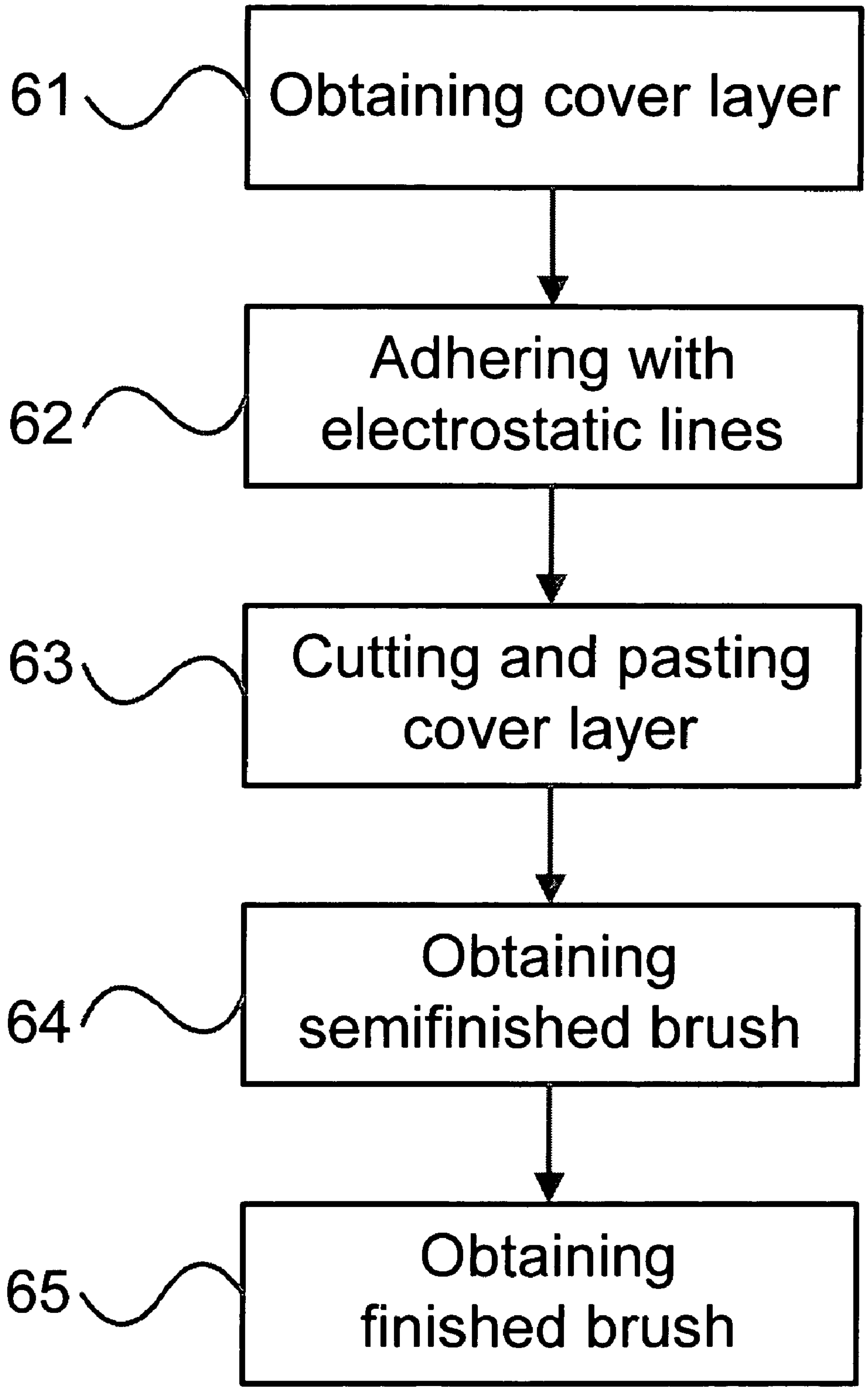
FIG. 3 is a view showing a flow chart according to the preferred embodiment of the present invention.
Figure 4:
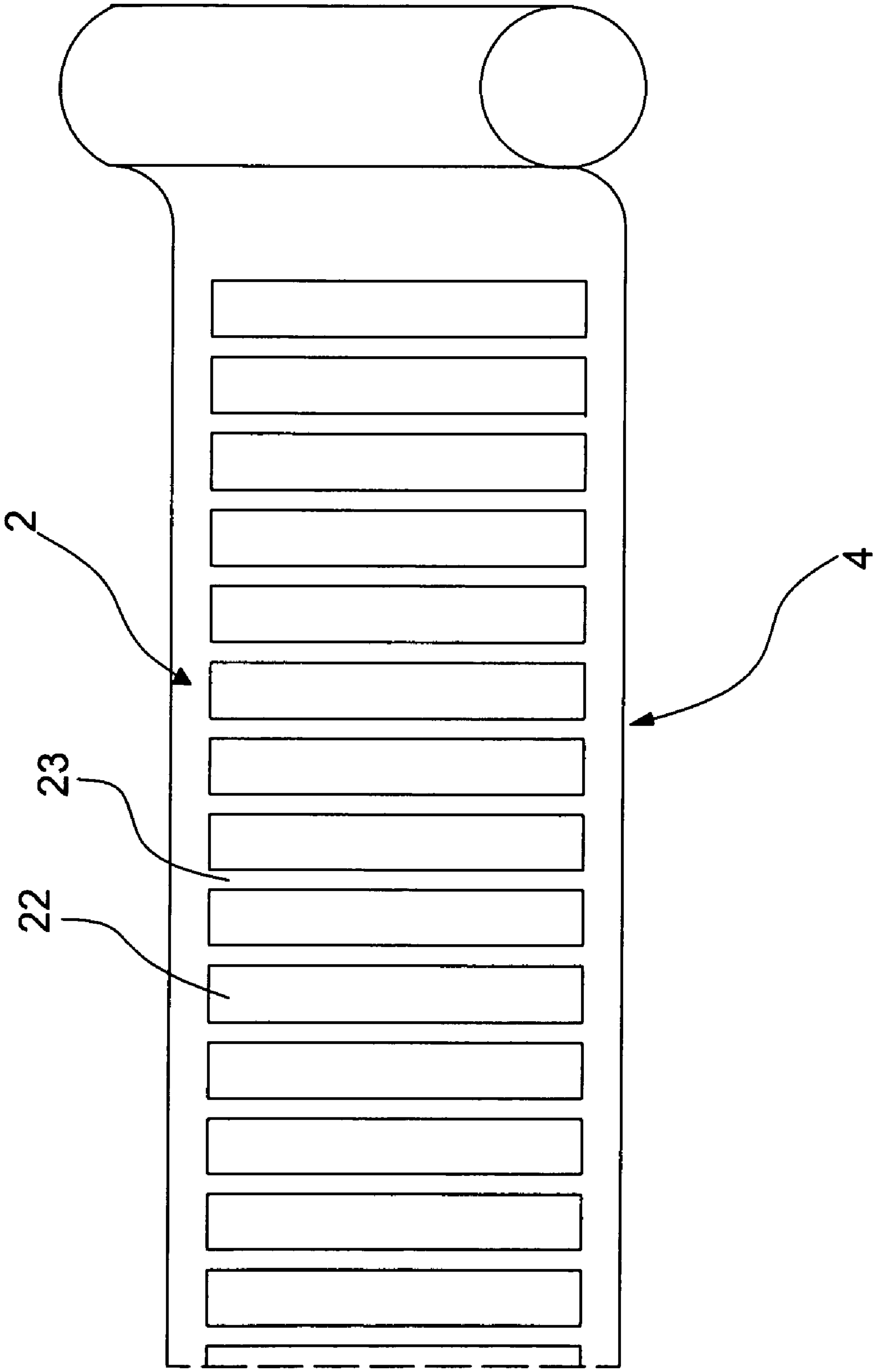
FIG. 4 is a view showing a cover layer according to the preferred embodiment of the present invention.

Please refer to FIG. 3, which is a view showing a flow chart according to the preferred embodiment of the present invention. As shown in the figure, the present invention is a method for fabricating an electrostatic-line brush, comprising the following steps:

(a) Obtaining a cover layer 61: Please further refer to FIG. 4, which is a view showing a cover layer according to the preferred embodiment of the present invention. As shown in the figure, a cover layer 2 is obtained adhered on a release paper 4 and is punched with square holes before being rolled. Hence, a cover layer 2 with a plurality of punched holes 22 having a connecting part between every two adjacent punched holes 22 is obtained.

(b) Adhering with electrostatic lines 62: Please further refer to FIG. 5, which is a view showing a cover layer adhering with electrostatic lines according to the preferred embodiment of the present invention. As shown in the figure, a cover layer 2 is ad he red with a plurality of electrostatic lines 3; the electrostatic lines 3 are deposed on an adhering surface 21 of the cover layer 2 by using a leading wire jig 5; the electrostatic lines 3 are sticked on the connecting part 23 and are deposed horizontally through the punched holes 22; and, the cover layer 2 and the electrostatic lines 3 are closely sticked tog ether by using a rolling wheel 51.

Figure 5:
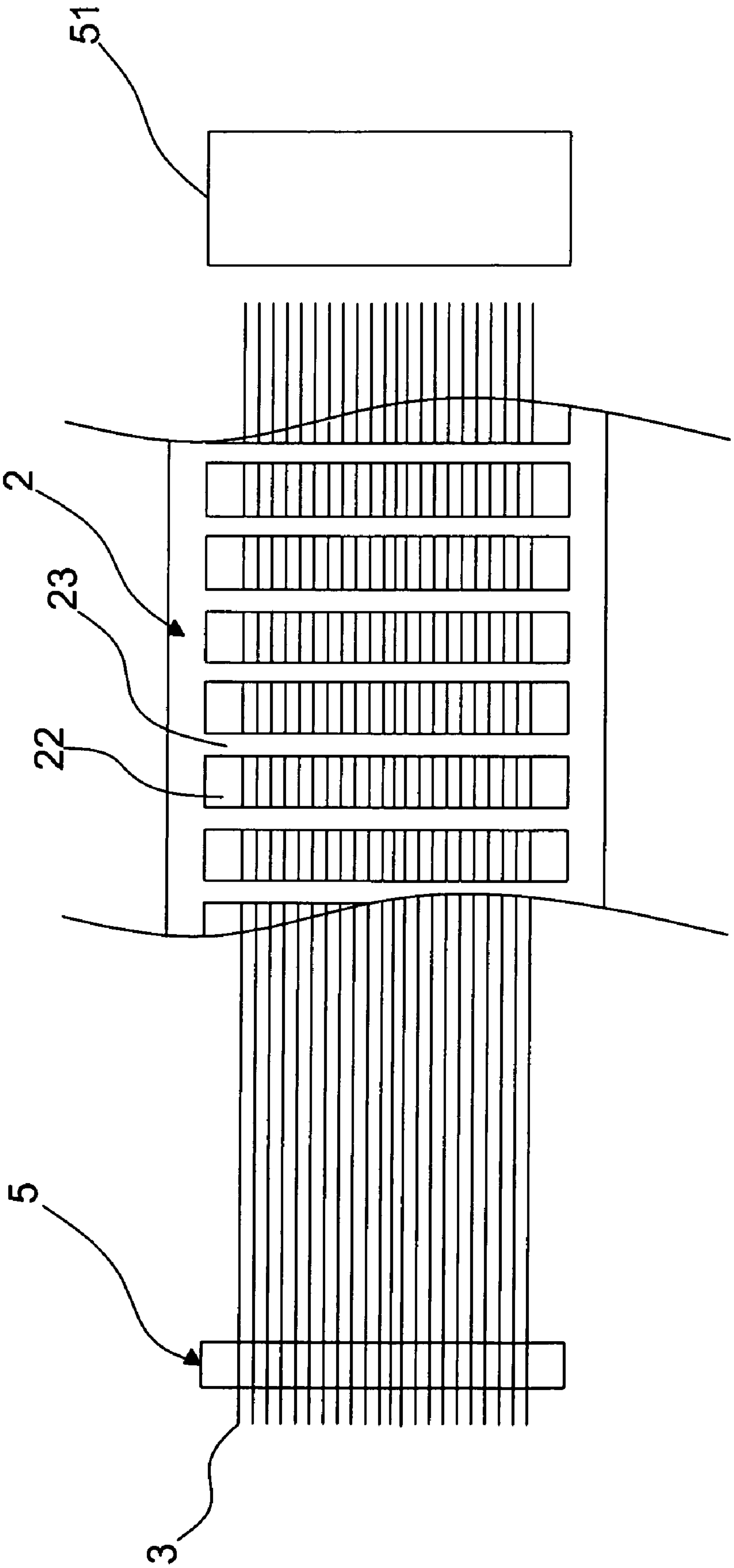
FIG. 5 is a view showing a cover layer adhering with electrostatic lines according to the preferred embodiment of the present invention.
Figure 6:
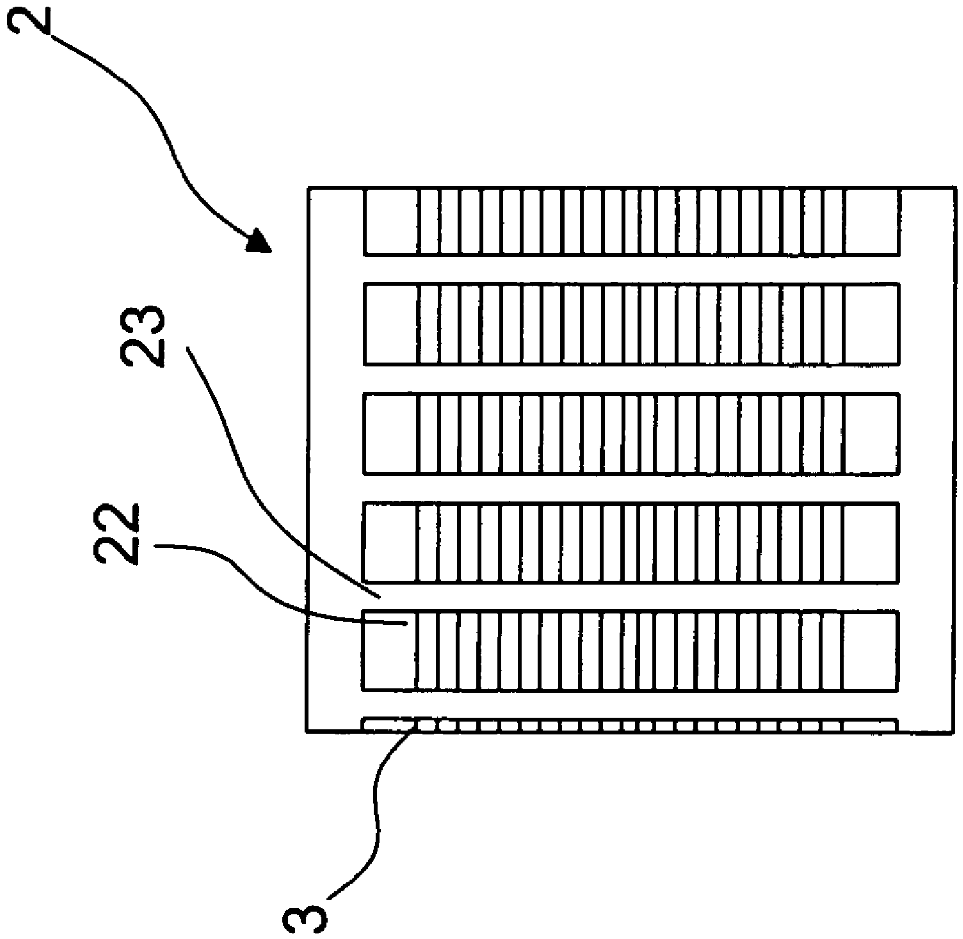
FIG. 6 is a view showing a cover layer having electrostatic lines according to the preferred embodiment of the present invention.

(c) Cutting and pasting cover layer 63: Please further refer to FIG. 6 and FIG. 7, which a reviews showing a cover layer having electrostatic lines and a cover layer adhering with a base layer according to the preferred embodiment of the present invention. As shown in the figures, after a cover layer 2 is adhered with electrostatic lines, the cover layer 2 is cut into a proper size (as shown in FIG. 5) and is adhered with a base layer 1 of a conductive template (polystyrene) or an aluminum foil tape (as shown in FIG. 6).

Figure 7:
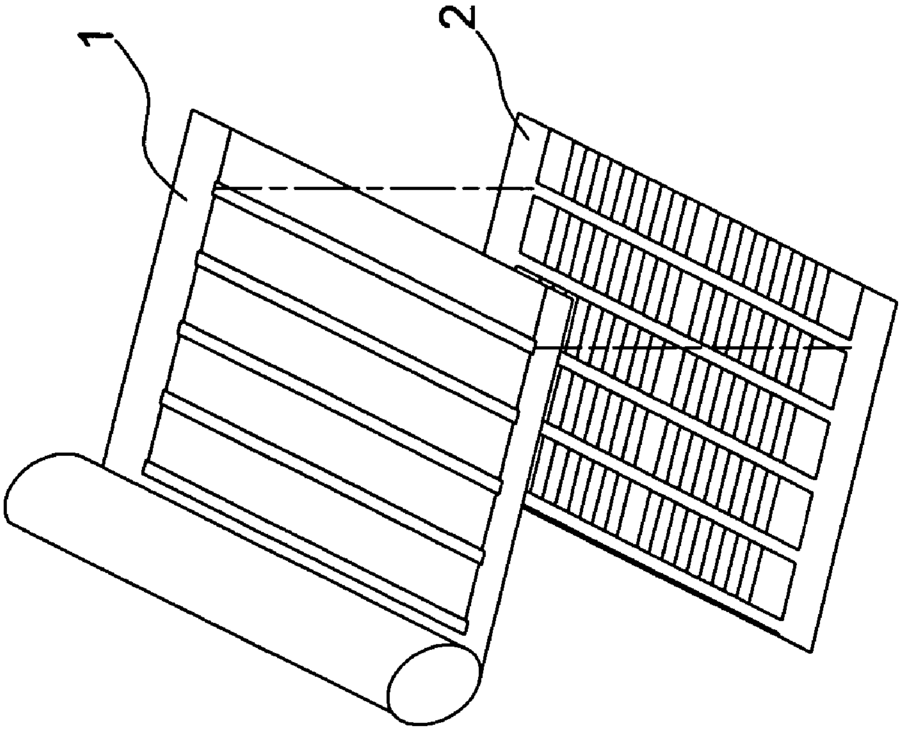
FIG. 7 is a view showing a cover layer adhering with a base layer according to the preferred embodiment of the present invention.
Figure 8:
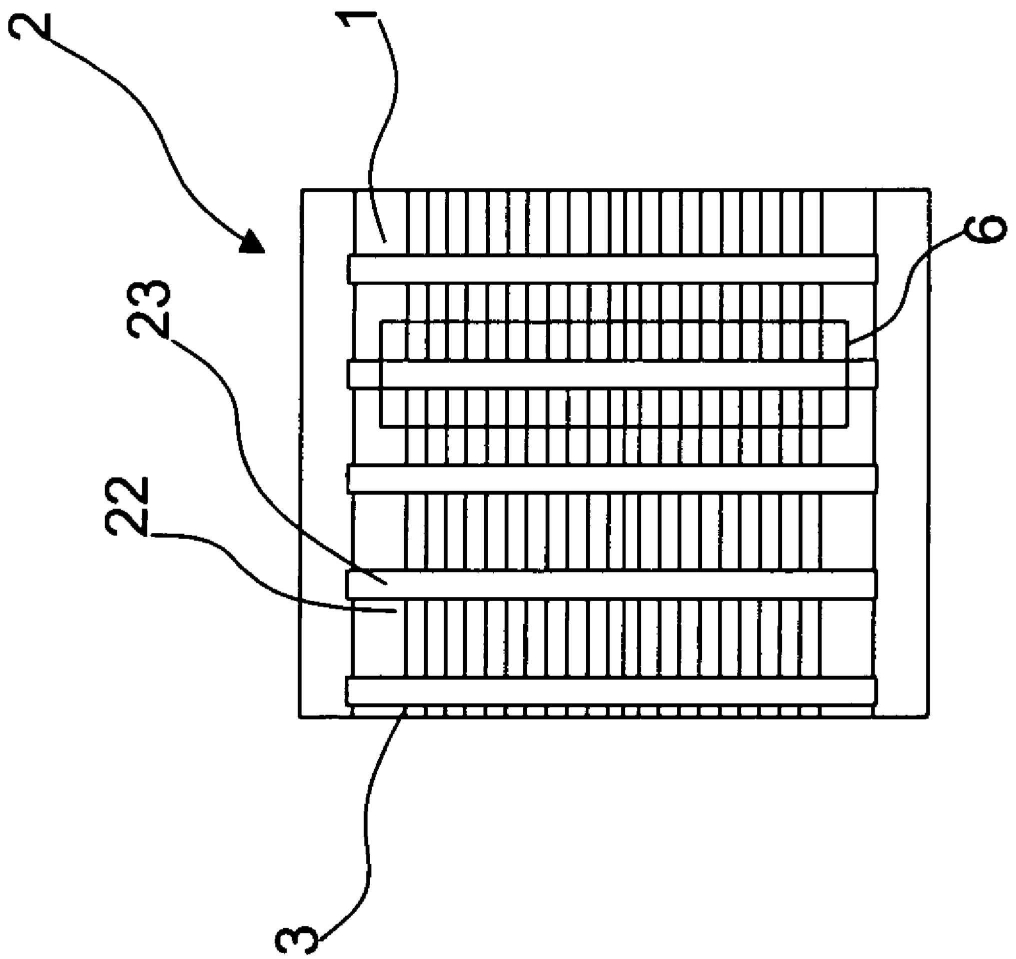
FIG. 8 is a view showing a cuting for obtaining a semifinished brush according to the preferred embodiment of the present invention.
Figure 9:
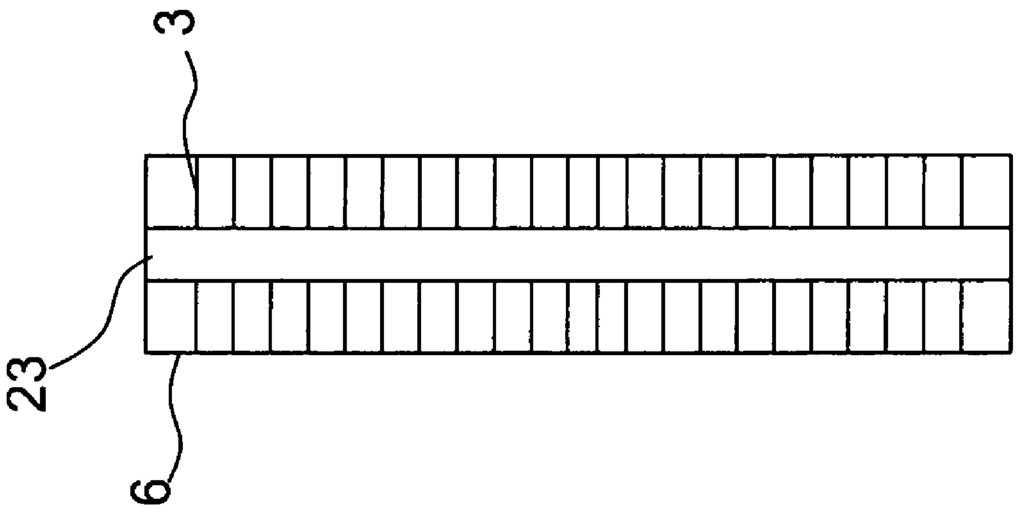
FIG. 9 is a view showing the semifinished brush according to the preferred embodiment of the present invention.

(d) Obtaining a semifinished brush 64: Please further refer to FIG. 8 and FIG. 9, which are a view showing a cutting for obtaining a semifinished brush and a view showing the semifinished brush according to the preferred embodiment of the present invention. As shown in the figures, after positioning by a mold, a semifinished brush 5 is cut from the middles of two adjacent punched holes with a connecting part 23 included (as shown in FIG. 7) so that the semifinished brush 5 is obtained with electrostatic lines at both sides of the connecting part 23 (as shown in FIG. 8).

Figure 10:
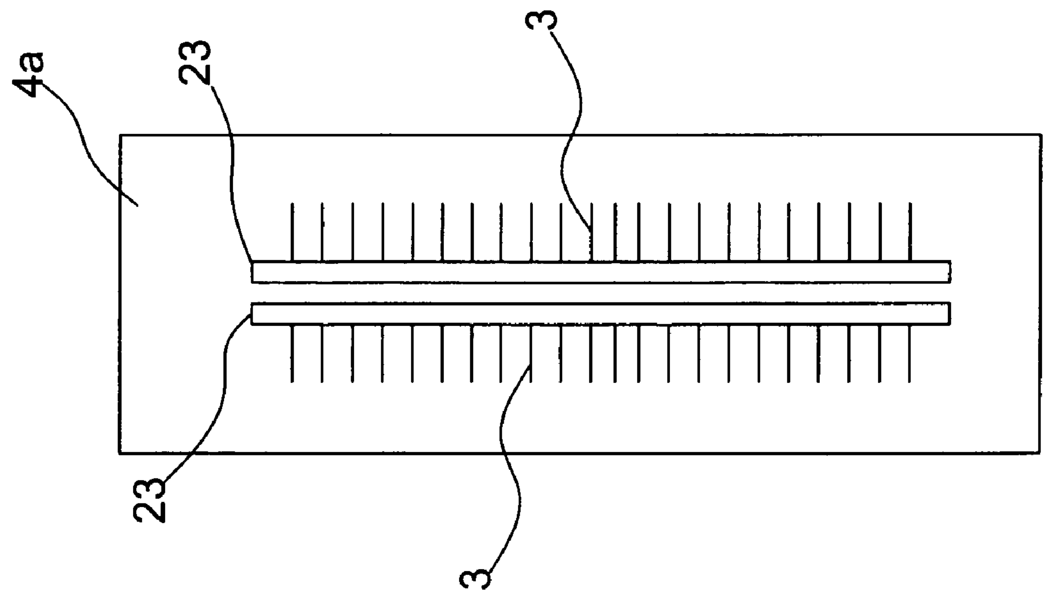
FIG. 10 is a view showing an electrostatic bush pasted on a release paper according to the preferred embodiment of the present invention.

And, (e) Obtaining a finished brush 65: Please further refer to FIG. 10, which is a view showing an electrostatic bush pasted on a release paper according to the preferred embodiment of the present invention. As shown in the FIG. 5, after examining the semifinished brush 5, the semifinished brush 5 is cut into halfs from the middle of the connecting part 23 so that a half of the original connecting part 23 obtained has electrostatic lines only at a side. The halfs of the connecting part 23 are then pasted on another release paper 4*a* to obtain a finished brush. When using the finished brush, a half of the connecting part 23 is obtained from the release paper 4*a* to be used with a bare hand, or by connecting the connecting part 253 to an electrical device or a hand-held tool.

To sum up, the present invention is a method for fabricating an electrostatic-line brush, where electrostatic lines are deposed through punched holes of a cover layer of a brush for easy fabrication and the brush is easily set on a required electrical device or a hand-held tool for easy usage.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method for fabricating an electrostatic-line brush, comprising steps of:

(a) obtaining a cover layer, said cover layer having more than one punched hole;

(b) adhering said cover layer with electrostatic lines, said electrostatic lines extending across said more than one punched hole;

(c) cutting said cover layer and sticking said cover layer to a base layer, said electrostatic lines located between said cover layer and said base layer;

(d) Cutting said cover layer sticked with said base layer to obtain a semifinished brush having said electrostatic lines; and (e) Cutting said semifinished brush into halves and pasting said halves of said semifinished brush on a release paper to obtain a finished brush having said electrostatic lines.

2. The method according to claim 1, wherein said base layer comprises a conductive template made of polystyrene.

3. The method according to claim 1, wherein said base layer comprises an aluminum foil tape.

4. The method according to claim 1, wherein a connecting part is located between two adjacent punched holes.

5. The method according to claim 1, wherein said cover layer is a tape having an adhering surface.

* * * * *